United States Patent
Shirai

(10) Patent No.: US 10,612,919 B2
(45) Date of Patent: Apr. 7, 2020

(54) ELECTRONIC DEVICE AND ALTITUDE CALCULATION METHOD

(71) Applicant: Seiko Epson Corporation, Shinjuku-ku (JP)

(72) Inventor: Tsubasa Shirai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 167 days.

(21) Appl. No.: 15/410,010

(22) Filed: Jan. 19, 2017

(65) Prior Publication Data

US 2017/0205232 A1    Jul. 20, 2017

(30) Foreign Application Priority Data

Jan. 20, 2016    (JP) .................. 2016-008502

(51) Int. Cl.
| | |
|---|---|
| *G01C 5/06* | (2006.01) |
| *G01S 19/42* | (2010.01) |
| *G01S 19/13* | (2010.01) |

(52) U.S. Cl.
CPC .............. *G01C 5/06* (2013.01); *G01S 19/13* (2013.01); *G01S 19/42* (2013.01)

(58) Field of Classification Search
None
See application file for complete search history.

(56) References Cited

U.S. PATENT DOCUMENTS

| 5,210,540 | A | * | 5/1993 | Masumoto | G01S 19/42 342/357.28 |
| 5,224,059 | A | * | 6/1993 | Nitta | G01C 5/06 368/11 |
| 5,265,025 | A | * | 11/1993 | Hirata | G01C 21/005 342/357.31 |
| 5,646,857 | A | * | 7/1997 | McBurney | G01C 5/00 701/469 |
| 5,717,406 | A | * | 2/1998 | Sanderford | G01S 1/022 342/363 |
| 6,434,485 | B1 | | 8/2002 | Beason et al. | |
| 6,518,918 | B1 | * | 2/2003 | Vannucci | G01C 5/06 137/81.1 |
| 6,522,298 | B1 | * | 2/2003 | Burgett | G01C 5/06 342/357.25 |
| 2006/0106559 | A1 | * | 5/2006 | Lerch | G01C 5/00 702/94 |

(Continued)

FOREIGN PATENT DOCUMENTS

| JP | 2008-241467 A | 10/2008 |
| JP | 2009-109203 A | 5/2009 |

(Continued)

*Primary Examiner* — Lina M Cordero

(74) *Attorney, Agent, or Firm* — Kilpatrick Townsend & Stockton LLP

(57) ABSTRACT

An electronic device includes a barometric pressure sensor detecting a barometric pressure; a GPS sensor receiving a positioning signal from a positioning satellite; a storage unit storing a position of a way point which is a candidate of a spot used by a user and an altitude of the way point; and a processing unit calculating an altitude by using the barometric pressure, the position calculated on the basis of the positioning signal, and the position of the way point and the altitude of the way point stored in the storage unit.

7 Claims, 11 Drawing Sheets

(56) References Cited

U.S. PATENT DOCUMENTS

| | | | |
|---|---|---|---|
| 2007/0030841 A1* | 2/2007 | Lee | G01S 5/0027 370/352 |
| 2007/0266783 A1* | 11/2007 | Saporito | G01C 5/06 73/384 |
| 2011/0224925 A1 | 9/2011 | Tsubata | |
| 2012/0013475 A1* | 1/2012 | Farley | G01S 5/0045 340/665 |
| 2012/0290253 A1* | 11/2012 | Barrett | G01C 5/06 702/150 |
| 2014/0011540 A1* | 1/2014 | Miyake | H04W 4/008 455/557 |
| 2014/0012529 A1* | 1/2014 | Lee | G01C 5/06 702/94 |
| 2014/0172351 A1* | 6/2014 | Barfield | G01C 5/06 702/138 |
| 2015/0233713 A1* | 8/2015 | Wolf | G01C 5/06 702/166 |
| 2015/0292885 A1* | 10/2015 | Sasaki | G01C 25/00 73/384 |
| 2015/0330779 A1* | 11/2015 | Moeglein | G01C 5/06 342/462 |
| 2016/0101319 A1 | 4/2016 | Tanabe et al. | |

FOREIGN PATENT DOCUMENTS

| | | |
|---|---|---|
| JP | 2011-215130 A | 10/2011 |
| JP | 2013-231634 A | 11/2013 |
| JP | 2015-004578 A | 1/2015 |
| JP | 2016-130694 A | 7/2016 |

* cited by examiner

| WAY POINT DATA TABLE | | | |
|---|---|---|---|
| WAY POINT | $\phi$ | $\lambda$ | h |
| W101 | 36.04859 | 138.0047 | 1121.81 |
| W102 | 36.05266 | 138.0046 | 1076.66 |
| W103 | 36.05899 | 138.0101 | 1061.66 |

FIG. 4

ELECTRONIC DEVICE AND ALTITUDE CALCULATION METHOD

CROSS-REFERENCE TO RELATED APPLICATIONS

The entire disclosure of Japanese Patent Application No. 2016-008502, filed Jan. 20, 2016 is expressly incorporated by reference herein.

BACKGROUND

1. Technical Field

The present invention relates to an electronic device and an altitude calculation method.

2. Related Art

A barometric altimeter for informing a user of a current altitude has been widely used in mountain climbing or the like. The barometric altimeter assumes a current altitude by applying an actually measured value of the atmospheric air pressure to a conversion expression (a height measurement expression) based on the fact that the atmospheric air pressure is low as an elevation of a spot becomes higher.

As is well known, parameters of the conversion expression are changed by the minute according to weather conditions, and thus, for example, it is necessary to perform calibration of barometric pressure and altitude measurement at a constant frequency such as every hour (or at a required timing).

Furthermore, herein, altitude measurement using a barometric pressure sensor will be referred to as "barometric pressure and altitude measurement", and setting or adjustment of conversion properties (conversion parameters) of converting output of the barometric pressure sensor into an altitude will be suitably referred to as "calibration".

In the calibration, an altitude of a spot where a user exists is used. For example, in U.S. Pat. No. 6,434,485, it is described that geography data including altitude information is stored in a memory, and acquires altitude information which corresponds to an altitude corresponding to a position determined by a GPS unit from the memory, and thus, calibration is performed.

However, in a case where calibration according to a variation in a barometric pressure is performed or a current altitude is calculated by using geography data, geography data which specifically covers a destination region of a user is required. For this reason, a data amount in geography data stored in a portable terminal device increases.

SUMMARY

An advantage of some aspects of the invention is to solve at least a part of the problems described above, and the invention can be implemented as the following forms or application examples.

APPLICATION EXAMPLE 1

An electronic device according to this application example includes: a barometric pressure sensor detecting a barometric pressure; a receiving unit receiving a positioning signal from a positioning satellite; a storage unit storing a position of a way point which is a candidate of a spot used by a user and an altitude of the way point; and a processor calculating an altitude by using the barometric pressure, a position calculated on the basis of the positioning signal, and the position of the way point and the altitude of the way point stored in the storage unit.

According to this application example, the altitude may be calculated on the basis of the barometric pressure detected by the barometric pressure sensor, the position calculated on the basis of the positioning signal, and the position and the altitude of the way point stored in the storage unit. The position and the altitude of the way point indicating the candidate of the spot used by the user are stored in the storage unit, and thus, a data amount required to be stored in the storage unit may be suppressed compared to a case of storing geography data which specifically covers geography.

APPLICATION EXAMPLE 2

In the electronic device according to the application example, it is preferable that the processor extracts the way point indicating a position in a predetermined distance from the position calculated on the basis of the positioning signal from the storage unit, and calculates the altitude by using an altitude of the extracted way point.

According to this application example, the way point indicating the position in the predetermined distance from the position calculated on the basis of the positioning signal is adopted, and thus, the accuracy of the altitude to be calculated may be improved.

APPLICATION EXAMPLE 3

In the electronic device according to the application example, it is preferable that in a case where a plurality of the way points are extracted, the processor calculates the altitude by using the altitude of the way point at which the distance from the position calculated on the basis of the positioning signal is minimized.

According to this application example, the altitude of the way point is used at which the distance from the position calculated on the basis of the positioning signal is minimized, and thus, a possibility of using an altitude at which an error with respect to an actual altitude is minimized is high, compared to a case of using an altitude of the other way point. For this reason, the accuracy of the altitude to be calculated may be improved.

APPLICATION EXAMPLE 4

In the electronic device according to the application example, it is preferable that in a case where a plurality of the way points are extracted, the processor calculates an average value of altitudes of the plurality of extracted way points, and calculates the altitude by using the average value.

According to this application example, the average value of the altitudes of the plurality of way points is calculated, and the altitude is calculated by using the calculated average value, and thus, even in a case where a way point including an error in the altitude is extracted, the influence of the error may be suppressed compared to a case of using an altitude of one way point.

APPLICATION EXAMPLE 5

In the electronic device according to the application example, it is preferable that the processor corrects the altitude by further using a ground height of the electronic device.

According to this application example, for example, in a case where the altitude of the way point indicates an altitude of a ground surface, the correction is performed by further using the ground height of the electronic device to be used, and thus, the altitude at which the electronic device exists may be calculated with more excellent accuracy.

APPLICATION EXAMPLE 6

In the electronic device according to the application example, it is preferable that the processor calculates the altitude from the barometric pressure, and performs calibration of the barometric pressure sensor by using the altitude calculated from the barometric pressure and the altitude of the way point.

According to this application example, the calibration of the barometric pressure sensor is performed by using the altitude of the way point and the altitude calculated from the barometric pressure, and thus, the accuracy of the calibration may be improved.

APPLICATION EXAMPLE 7

An altitude calculation method according to this application example includes: detecting a barometric pressure; receiving a positioning signal from a positioning satellite; and calculating an altitude by using the barometric pressure, a position calculated on the basis of the positioning signal, and a position of a way point which is a candidate of a spot used by a user and an altitude of the way point stored in advance.

According to this application example, the altitude may be calculated on the basis of the barometric pressure detected by the barometric pressure sensor, the position calculated on the basis of the positioning signal, and the position and the altitude of the way point stored in the storage unit. The position and the altitude of the way point indicating the candidate of the spot used by the user are stored in the storage unit, and thus, a data amount required to be stored in the storage unit may be suppressed compared to a case of storing geography data which specifically covers geography.

APPLICATION EXAMPLE 8

An altitude calculation program according to this application example causes a computer to execute: calculating an altitude by using a barometric pressure detected by a barometric pressure sensor, a position calculated on the basis of a positioning signal received from a positioning satellite, and a position of a way point which is a candidate of a spot used by a user and an altitude of the way point stored in advance.

According to this application example, the altitude may be calculated on the basis of the barometric pressure detected by the barometric pressure sensor, the position calculated on the basis of the positioning signal, and the position and the altitude of the way point stored in the storage unit. The position and the altitude of the way point indicating the candidate of the spot used by the user are stored in the storage unit, and thus, a data amount required to be stored in the storage unit may be suppressed compared to a case of storing geography data which specifically covers geography.

BRIEF DESCRIPTION OF THE DRAWINGS

The invention will be described with reference to the accompanying drawings, wherein like numbers reference like elements.

FIG. 4 is a diagram illustrating a table of the way point data.

DESCRIPTION OF EXEMPLARY EMBODIMENTS

Embodiment

Hereinafter, preferred embodiments of the invention will be described in detail by using the drawings. Furthermore, the embodiments described below do not unreasonably limit the contents of the invention described in the appended claims. In addition, all configurations described below are not limited to essential requirements of the invention.

1. Embodiment of Electronic Device 1-1. Outline of Electronic Device

Figure 1:
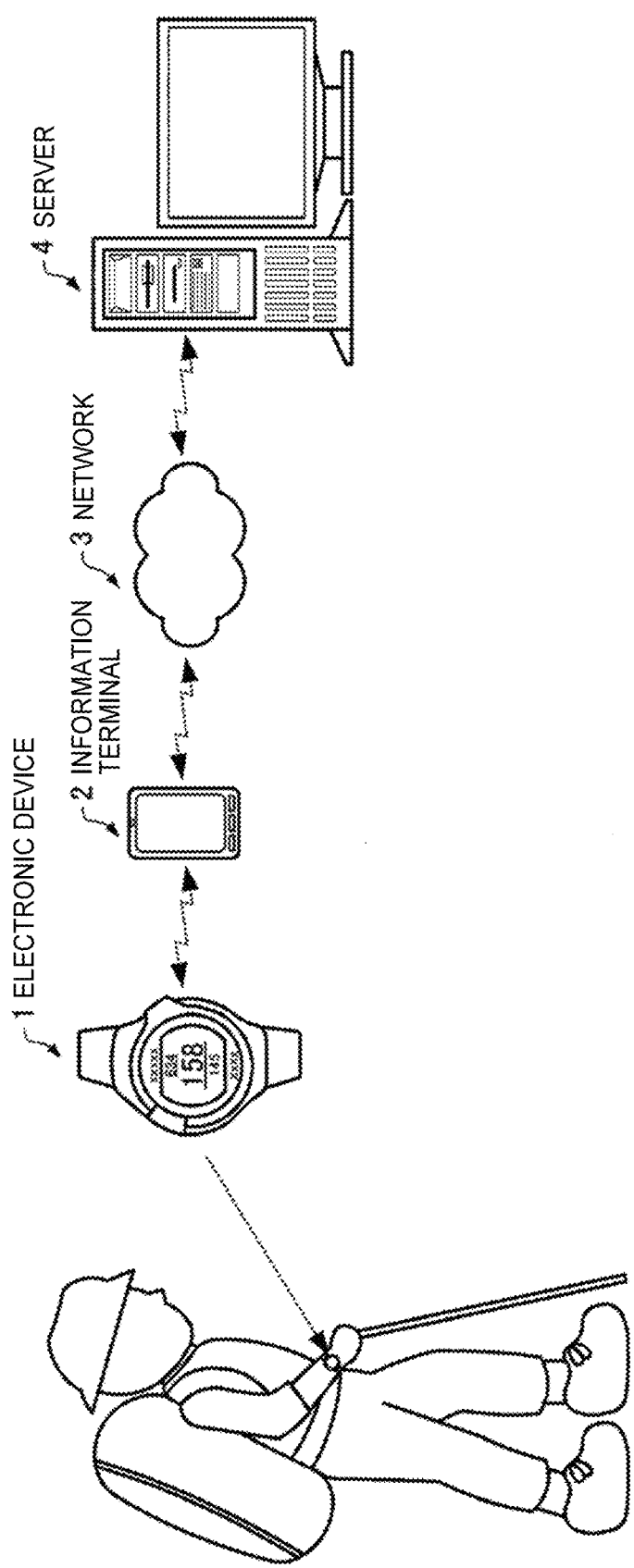
FIG. 1 is a diagram illustrating the outline of a system including an electronic device according to an embodiment.

FIG. 1 is a diagram illustrating the outline of a system including an electronic device.

The system includes an electronic device 1, an information terminal 2, and a server 4. The system can be referred to as an altitude calculation system, a navigation system, a performance monitoring system, and the like.

The electronic device 1, for example, is a portable information device which is mounted on a part of the body of a user in an outdoor zone such as mountain climbing. A mounting target of the electronic device 1, for example, is a portion from an elbow to a hand (a front arm) to be visible when the user needs. In an example illustrated in FIG. 1, the electronic device 1 is configured as a wrist type (a wristwatch type) portable information device (an outdoor watch), and the mounting target of the electronic device 1 is a wrist.

The electronic device 1, for example, has a clocking function, a positioning function, a barometric pressure detect function, a navigation function, and the like, which are functions as the outdoor watch. Hereinafter, the description will be made by assuming that the electronic device 1 is applied to mountain climbing.

The user operates the information terminal 2 such as a smart phone, a tablet PC, and a desktop PC at home or in an accommodation, and designates a mountain climbing route which is planned to the information terminal 2, as previous preparation before performing mountain climbing. In addition, in the information terminal 2, data of a way point which is a candidate of a spot used by the user is downloaded from the server 4 through a network 3. The mountain climbing route can be changed by the user during the mountain climbing, and thus, the way point is the candidate of the spot to be used in a stage where the mountain climbing is planned. In this embodiment, the way point is spot information on a route, and includes a latitude, a longitude, and an altitude of a water place, a mountain cabin, a mountain peak, and the like, which are important points of the mountain climbing route.

A simple map based on map data is displayed and a latitude, a longitude, an altitude, an azimuth, and the like of a spot where the user exists are sequentially displayed (a navigation function), on a display screen of the electronic device 1, during the mountain climbing. In this embodiment, a map generated by using data of the way point which is prepared by using the map data is displayed. At this time, the electronic device 1 displays a latitude (a GPS latitude) and a longitude (a GPS longitude) calculated on the basis of GPS signal described below as the latitude and the longitude of the spot where the user exists, and displays an altitude calculated by barometric pressure and altitude measurement (a barometric pressure sensor altitude) as the altitude of the spot where the user exists.

A map (a simple map) based on the map data is displayed and the latitude, the longitude, the altitude, the azimuth, and the like of the spot where the user exists are sequentially displayed (the navigation function), on the display screen of the electronic device 1, during the mountain climbing. At this time, the electronic device 1 displays the latitude (the GPS latitude) and the longitude (the GPS longitude) calculated on the basis of the GPS signal described below as the latitude and the longitude of the spot where the user exists, and displays the altitude calculated by the barometric pressure and altitude measurement (the barometric pressure sensor altitude) as the altitude of the spot where the user exists.

Furthermore, it is considered that the reason of using the barometric pressure sensor altitude as the altitude of the spot instead of a GPS altitude is because the GPS altitude has a positioning error, and thus, the barometric pressure sensor altitude indicates the altitude with higher accuracy, compared to the GPS altitude. However, there is a possibility that the accuracy of the barometric pressure sensor altitude decreases due to a variation such as weather. In order to prevent a decrease in the accuracy of the barometric pressure sensor altitude, the electronic device 1 performs calibration of the barometric pressure and altitude measurement every predetermined period of time or at a suitable timing. The details of the barometric pressure and altitude measurement including the calibration will be described below. In addition, the navigation function of the electronic device 1 is realized by a known method, and the detailed description will be omitted.

In addition, the electronic device 1 performs recording (logging) with respect to a mountain climbing history (a mountain climbing log) of the user, during the mountain climbing. The latitude, longitude, altitude, and the like of the spot where the user exists are included in the mountain climbing log at each point of time. Here, the latitude and the longitude in the mountain climbing log are set to the latitude (the GPS latitude) and the longitude (the GPS longitude) calculated on the basis of the GPS signal, and the altitude in the mountain climbing log is set to the barometric pressure sensor altitude calculated by the barometric pressure and altitude measurement. The reason of using the barometric pressure sensor altitude as the altitude in the mountain climbing log instead of the GPS altitude is because the barometric pressure sensor altitude indicates the altitude with higher accuracy, compared to the GPS altitude, as with the reason described above. Furthermore, a composite altitude obtained by performing statistical processing, filter processing, or the like with respect to the GPS altitude and the barometric pressure sensor altitude can also be used as an altitude in navigation and logging. Even in such a case, by combining the barometric pressure sensor altitude, it is possible to expect to obtain an altitude having high accuracy even in a case of independently using the GPS altitude.

After the mountain climbing ends, the user connects the information terminal 2 to the electronic device 1 at home or in the accommodation. The information terminal 2 reads out data of the mountain climbing log (log data) accumulated in the electronic device 1, and uploads the data to the server 4 through the network 3. The server 4 stores the uploaded log data in association with identification information of the user (a user ID). After that, the server 4 transmits a part or all of the log data of the user to the information terminal 2 through the network 3, according to a request from the information terminal 2 of the user. Accordingly, the user can confirm the user's own mountain climbing log on the display screen of the information terminal 2 at an arbitrary timing.

1-2. Configuration of System

Figure 2:
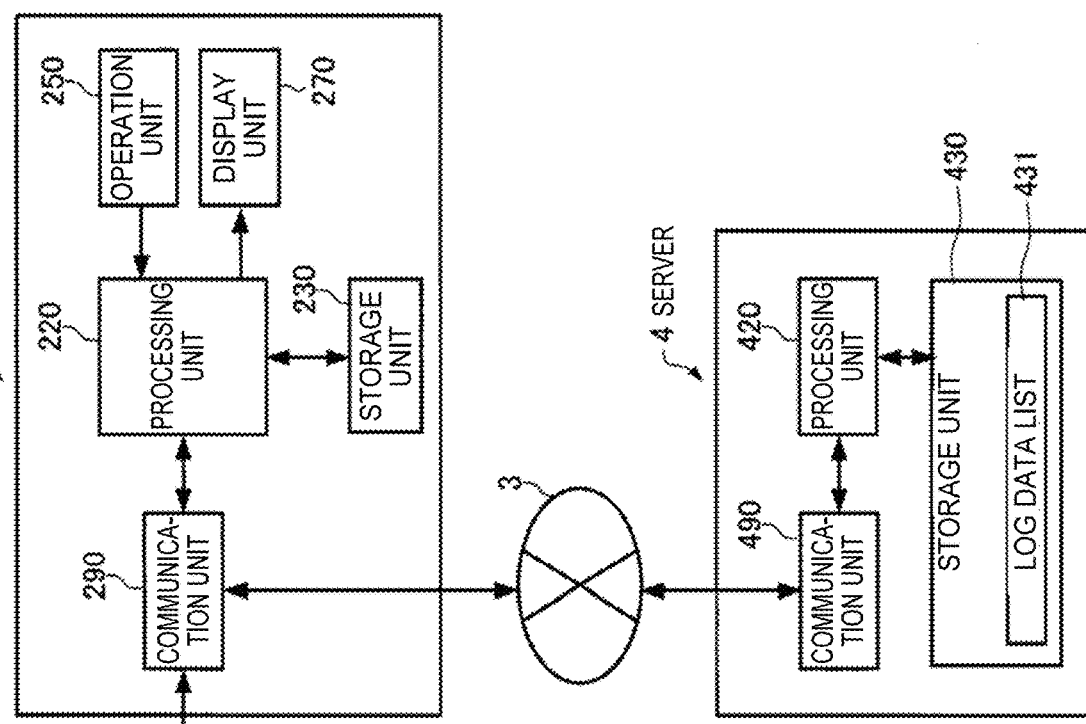
FIG. 2 is a functional block diagram illustrating the configuration of the system.
Figure 2:
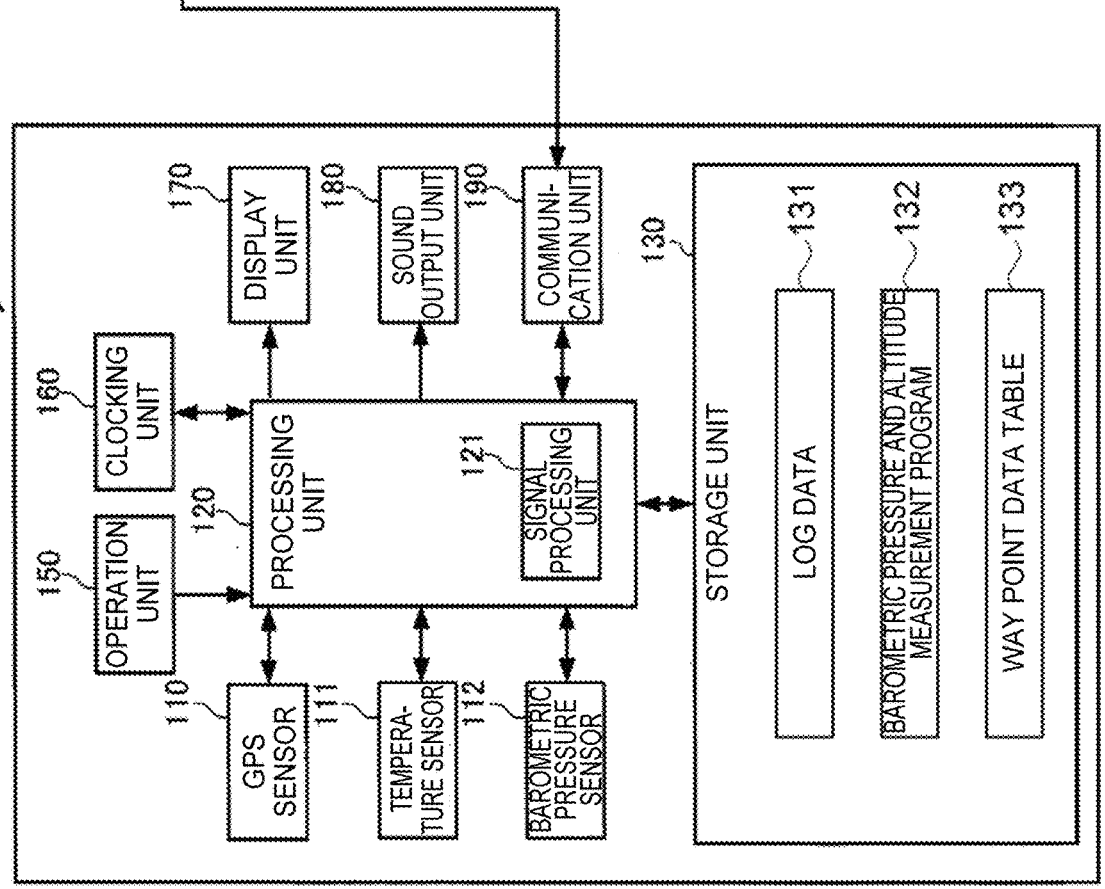

FIG. 2 is a functional block diagram illustrating the configuration of the system.

The electronic device 1 is configured by including a GPS sensor (an example of a receiving unit) 110, a temperature sensor 111, a barometric pressure sensor 112, a processing unit (an example of a processor, and an example of a computer) 120, a storage unit 130, an operation unit 150, a clocking unit 160, a display unit 170, a sound output unit 180, a communication unit 190, and the like. Here, the electronic device 1 may be configured by removing or changing a part of the constituents, or may be configured by adding other constituents thereto. For example, in a case where it is necessary to display an azimuth, the electronic device 1 may include a geomagnetic sensor.

The GPS sensor 110 is a sensor which generates positioning data (a latitude, a longitude, and an altitude) indicating the position of the electronic device 1 and outputs the positioning data to the processing unit 120, and for example, is configured by including a global positioning system (GPS) receiver, and the like. The GPS sensor 110 receives an electromagnetic wave in a predetermined frequency range coming from the outside by a GPS antenna (not illustrated), extracts a GPS signal (an example of a positioning signal) from a GPS satellite (an example of a positioning satellite), and generates the positioning data indicating the position (the latitude, the longitude, and the altitude) and the like of the electronic device 1 on the basis of the GPS signal.

The temperature sensor 111 is an element which outputs a signal according to the ambient temperature around the temperature sensor 111 (that is, detects a temperature), and for example, a thermistor, a thermocouple, and the like are applied.

The barometric pressure sensor 112 is an element which outputs a signal according to the atmospheric air pressure around the barometric pressure sensor 112 (that is, detects a barometric pressure), and for example, includes a (vibration type) pressure sensitive element using a change in a resonance frequency of a vibration piece. The pressure sensitive element, for example, is a piezoelectric vibrator formed of a piezoelectric material such as crystal, lithium niobate, and lithium tantalate, and for example, a tuning fork type vibrator, dual tuning fork type vibrator, AT vibrator (a thicknessslide vibrator), an SAW resonator, and the like are applied to the pressure sensitive element.

The processing unit (an example of the processor) 120, for example, is configured of micro processing unit (MPU), a digital signal processor (DSP), application specific integrated circuit (ASIC), and the like. The processing unit 120 realizes functions of performing various processings by cooperating with hardware, according to a program stored in the storage unit 130 and various commands input by the user through the operation unit 150. The processing of the processing unit 120 includes data processing with respect to data generated by the GPS sensor 110, the temperature sensor 111, the barometric pressure sensor 112, the clocking unit 160, and the like (in a case where an input signal is an analog signal, A/D conversion processing is also included). In addition, the processing of the processing unit 120 includes display processing of displaying an image on the display unit 170, sound output processing of outputting a sound to the sound output unit 180. Furthermore, the signal processing unit 121 illustrated in FIG. 2, visualizes a function particularly relevant to the barometric pressure and altitude measurement, among the functions of the processing unit 120. The details of the signal processing unit 121 will be described below.

The storage unit 130, for example, is configured of one or a plurality of integrated circuit (IC) memories, and the like, and includes a read only memory (ROM) in which a program or the like is stored, and a random access memory (RAM) which becomes a working area of the processing unit 120. Furthermore, the RAM also includes a non-volatile RAM, and log data 131, a way point data table 133, and the like are stored in the non-volatile RAM. In addition, the program written in the ROM also includes a barometric pressure and altitude measurement program (an example of an altitude calculation program) 132 executed by the signal processing unit 121.

The operation unit 150, for example, is configured by including at least one of a button, a key, a microphone, a touch panel, a sound recognition function, an action detection function of an acceleration sensor (not illustrated), and the like, and performs processing by converting an instruction from the user into a suitable signal and by transmitting the converted instruction to the processing unit 120.

The clocking unit 160, for example, is configured of a real time clock (RTC) IC and the like, generates time data such as a year, a month, a day, an hour, a minute, and a second and transmits the time data to the processing unit 120.

The display unit 170, for example, is configured of a liquid crystal display (LCD), an organic electroluminescence (EL) display, an electrophoretic display (EPD), a touch panel type display, and the like, and displays various images according to the instruction from the processing unit 120.

The sound output unit 180, for example, is configured of a speaker, a buzzer, a vibrator, and the like, and generates various sounds (or vibrations) according to the instruction from the processing unit 120.

The communication unit 190 performs various controls for establishing data communication between the electronic device 1 and the information terminal 2 (a smart phone or the like). The communication unit 190, for example, is configured by including a transceiver supporting short-range radio communication standards such as Bluetooth (Registered Trademark) (including Bluetooth low energy (BTLE)), wireless fidelity (Wi-Fi) (Registered Trademark), Zigbee (Registered Trademark), near field communication (NFC), and ANT+ (Registered Trademark).

The information terminal 2 is an information terminal such as a smart phone, a tablet PC, and a desktop PC, which can be connected to the network 3 such as the internet. The information terminal 2 includes a communication unit 290, a processing unit 220, a storage unit 230, an operation unit 250, a display unit 270, and the like.

The communication unit 290 is a communication unit which is capable of communicating with the communication unit 190 of the electronic device 1, and performs various controls for establishing data communication between the electronic device 1 and the information terminal 2. The communication unit 290, for example, is configured by including a transceiver supporting short-range radio communication standards such as Bluetooth (Registered Trademark) (including Bluetooth low energy (BTLE)), Wi-Fi (Registered Trademark), Zigbee (Registered Trademark), near field communication (NFC), and ANT+ (Registered Trademark). Furthermore, the communication unit 290 is capable of communicating with the server 4 through the network 3, and also performs various controls for establishing data communication between the information terminal 2 and the server 4.

The processing unit 220, for example, is configured of a micro processing unit (MPU), a digital signal processor (DSP), an application specific integrated circuit (ASIC), and the like. The processing unit 220 performs various processings according to a program stored in the storage unit 230, and various commands input by the user through the operation unit 250.

The storage unit 230, for example, is configured of one or a plurality of IC memories, and the like, and includes an ROM in which a program or the like is stored, and an RAM which becomes a working area of the processing unit 220. The program, for example, is downloaded from the server 4 through the network 3 such as the internet.

The operation unit 250, for example, is configured of a button, a key, a microphone, a touch panel, a sound recognition function, an action detect function of an acceleration meter, and the like, and performs processing by converting an instruction from the user into a suitable signal and by transmitting the converted instruction to the processing unit 220.

The display unit 270, for example is configured of a liquid crystal display (LCD), an organic electroluminescence (EL) display, an electrophoretic display (EPD), a touch panel type display, and the like, and displays various images according to the instruction from the processing unit 220.

The server 4 is a network server connected to the network 3 such as the internet. The server 4 includes a communication unit 490, a processing unit 420, a storage unit 430, and the like.

The communication unit 490 is capable of communicating with the information terminal 2 through the network 3, and performs various controls for establishing data communication between information terminal 2 and the server 4.

The processing unit 420, for example, is configured of a micro processing unit (MPU), a digital signal processor (DSP), an application specific integrated circuit (ASIC), and the like. The processing unit 420, for example, has a function of managing the log data which is uploaded from the user of the electronic device 1 through the information terminal 2 and the network 3 in association with the user identification information (the user ID) or providing necessary map data or a necessary program to the information terminal 2 of the user of the electronic device 1.

The storage unit 430 stores map data of a global area (each area on the earth). In addition, the storage unit 430 stores log data items of a plurality of users with respect to each of the users (with respect to each user IDs). In FIG. 2, log data associated with the user ID of the user of the electronic device 1 of this embodiment is visualized as a log data list 431. The log data list 431 stores a plurality of log data items relevant to the user. Each of the log data items is acquired by the logging described above.

Furthermore, the electronic device 1, the information terminal 2, and the server 4 transmit and receive the log data or the way point each other in a predetermined format. For example, the processing unit 120 of the electronic device 1 transmits the log data 131 stored in the storage unit 130 to the information terminal 2 in a predetermined format, and the processing unit 220 of the information terminal 2 transmits the log data received from the electronic device 1 to the server 4 in a predetermined format.

In addition, the processing unit 420 of the server 4 transmits one or a plurality of log data items included in the log data list 431 which is stored in the storage unit 430 to the information terminal 2 in a predetermined format. In addition, for example, the processing unit 420 of the server 4 transmits at least a part of the map data stored in the storage unit 430 to the information terminal 2 in a predetermined format, and the processing unit 220 of the information terminal 2 transmits at least a part of the map data to the electronic device 1 in a predetermined format. Furthermore, the predetermined formats which are transmitted and received between the electronic device 1, the information terminal 2, and the server 4 may be entirely in common, or may be converted as necessary.

In addition, an acquisition destination of the way point which is acquired by the electronic device 1 can be suitably changed. For example, the way point may be acquired from another electronic device existing in the circumference, instead of being acquired from the information terminal 2. In addition, the electronic device 1 directly accesses the network 3, and the way point may be acquired from the server 4, insofar as having a suitable communication function.

1-2-1. Regarding GPS Sensor

The GPS sensor 110 includes an RF receiving circuit unit which down converts a high frequency signal (a radio frequency (RF) signal) received by an antenna (not illustrated) into an intermediate frequency signal, and amplifies the converted intermediate frequency signal, and then, converts the amplified intermediate frequency signal into a digital signal.

In addition, the GPS sensor 110 includes a baseband circuit unit which performs correlation calculation with respect to the digital signal (a baseband signal) from the RF receiving circuit unit. Furthermore, direct conversion method can be adopted in which the high frequency signal is directly converted into the baseband signal without being down converted into the intermediate frequency signal.

In addition, the baseband circuit unit performs known correlation calculation with respect to the received signal, and thus, a plurality of GPS satellites are captured by performing retrieval (frequency search and phase search) of a GPS signal encoded by predetermined rules, a phase and a frequency, at which a peak of a correlation value is detected, are found at each of the captured GPS satellites, and the phase and the frequency are set to a code phase and a received frequency of the GPS signal.

In addition, the baseband circuit unit decodes the captured GPS signal and acquires an ephemeris (satellite track information indicating a track of the GPS satellite), time information, or the like. In addition, the baseband circuit unit performs known calculation by using the acquired ephemeris, the acquired time information, or the like, and calculates a pseudo distance between the GPS satellite and the electronic device 1 (accurately, a pseudo distance between the GPS satellite and the antenna of the GPS sensor 110), a velocity vector of the electronic device 1 (accurately, a velocity vector of the GPS sensor 110), the position and the altitude of the electronic device 1 (accurately, a position and an altitude of the GPS sensor 110, and the position includes a latitude and a longitude), and the like. Furthermore, each of the code phase, the pseudo distance, and the velocity vector is also one type of the positioning data described above.

1-2-2. Regarding Example of Preparation Method of Way Point Data

Figure 3:
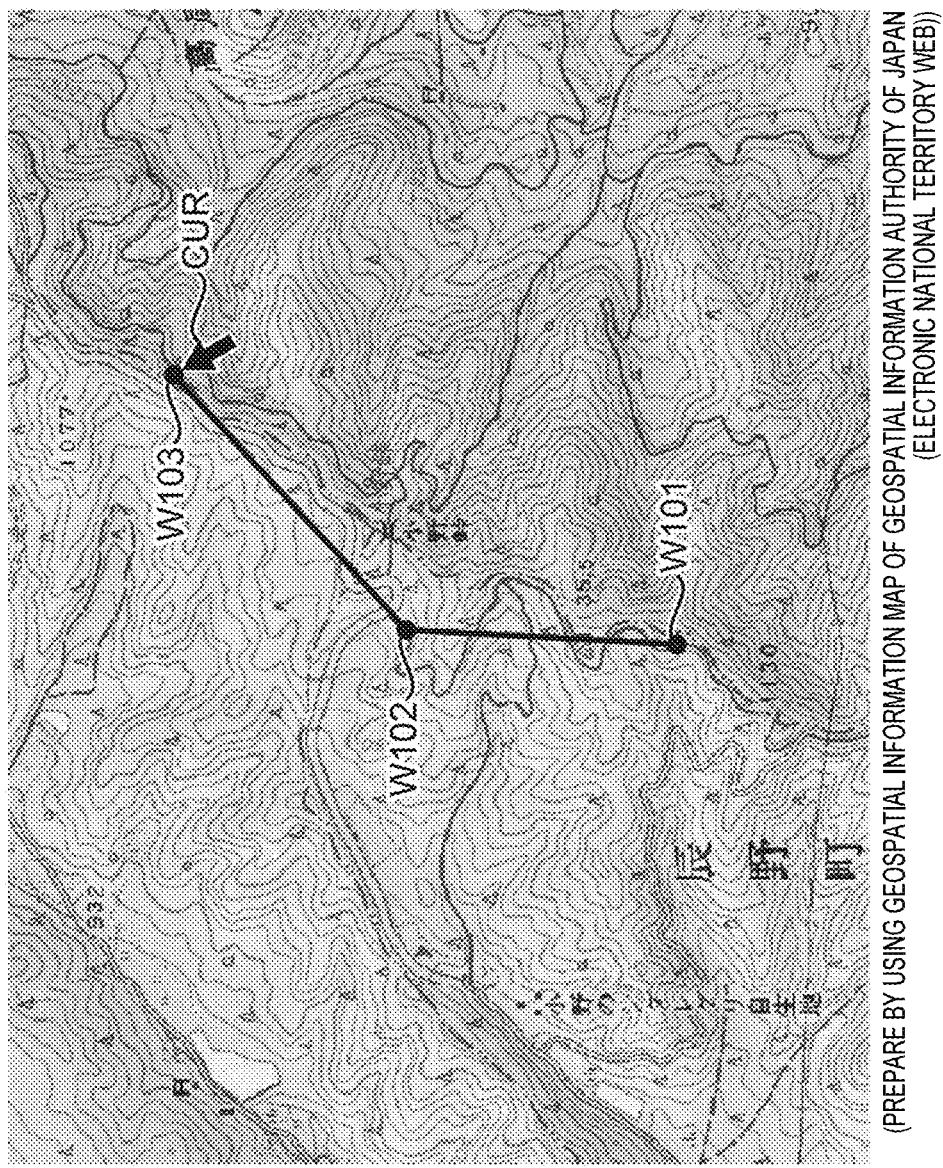
FIG. 3 is a diagram illustrating an example of a preparation method of way point data.

FIG. 3 is a diagram illustrating a data preparation method of the way point. Map data in FIG. 3 is prepared by using a geospatial information map of Geospatial Information Authority of Japan.

The user prepares the way point by using application (application software) of displaying a map on a screen of a personal computer or a smart phone, which is the information terminal 2. For example, in FIG. 3, the user performs a click operation by moving a cursor CUR to a first spot (W101) on the map, and thus, the first spot (W101) is registered as a first way point. Subsequently, the user performs the click operation by moving the cursor CUR to a second spot (W102) on the map, and thus, the second spot (W102) is registered as a second way point.

In this case, the application displaying the map may display the map such that the user easily and intuitively grasps a relationship between W101 and W102 by connecting W101 and W102 with a straight line.

Further, the user performs the click operation by moving the cursor CUR to a third spot (W103) on the map, and thus, the third spot (W103) on the map is registered as a third way point. Even in this case, the application displaying the map may display the map such that the user easily and intuitively grasps a relationship between W102 and W103 by connecting W102 and W103 with a straight line. Furthermore, in a case where the map includes route data (information of a route which can be actually moved by the user), a route between the registered way points may be emphatically displayed.

The application displaying the map receives the operation from the user, determines the way point, acquires position information and altitude information corresponding to the determined way point from the map data, and stores the position information and the altitude information in the storage unit 230. Further, in a case where the application displaying the map is connected to the electronic device 1 to be capable of communicating with the electronic device 1, the data of the way point stored in the storage unit 230 is written in the storage unit 130 of the electronic device 1 as the way point data table 133. Therefore, the application displaying the map of this embodiment can also be referred to as way point registration application.

1-2-3. Regarding Way Point Data

FIG. 4 is a diagram illustrating the way point data table 133 stored in the storage unit 130.

Figure 5:
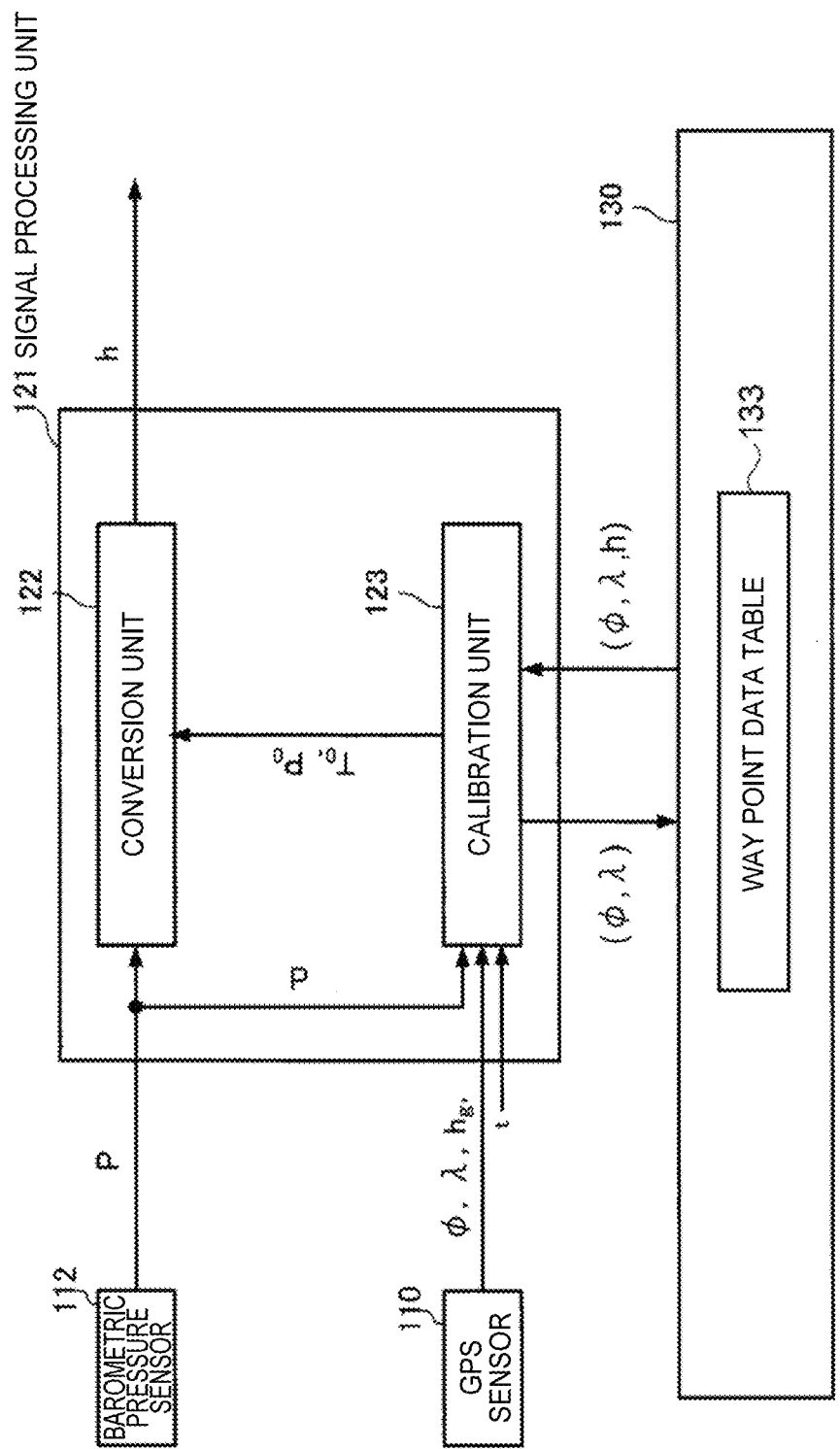
FIG. 5 is a functional block diagram illustrating a function of a signal processing unit.

When calibration of the barometric pressure and altitude measurement (calibration of a conversion unit 122 in FIG. 5) of a signal processing unit 121 is performed, the way point data table 133 is referred by a calibration unit 123 of the signal processing unit 121 (refer to FIG. 5).

The calibration unit 123 extracts a list of the way points, in which a distance with respect to the position of the GPS sensor 110 is short, from the way point data table 133, and estimates an altitude hw of the spot where the electronic device 1 exists (hereinafter, referred to as an altitude hw in a current position) therefrom. That is, the way point data table 133 is used for estimating an accurate altitude of the spot where the electronic device 1 exists.

The way point data table 133 stores position information indicating a position of an important point of the mountain climbing route in a predetermined format. As described above, although the way point is set before the time and date of starting the barometric pressure and altitude measurement, that is, at the time of performing previous preparation of the mountain climbing, several way points may be stored in the storage unit 130 in advance at the time of performing factory shipment with respect to the electronic device 1. In this case, the way point, for example, is position information of an important point or the like of a conspicuous mountain climbing route, and the way point data table 133 may be configured of the data of the way point transmitted from the information terminal 2 and the data of the way point stored in advance.

In this embodiment, the way point data table 133 stores a latitude ($\varphi$), a longitude ($\lambda$), and an altitude (h) of the way point data (the first spot W101, the second spot W102, and the third spot W103) set at the time of performing the previous preparation with respect to the mountain climbing in a table format.

1-2-4. Regarding Signal Processing Unit

FIG. 5 is a functional block diagram for illustrating a function of the signal processing unit 121.

As illustrated in FIG. 5, the signal processing unit 121 includes the conversion unit 122 and the calibration unit 123.

At least, a barometric pressure P output from the barometric pressure sensor 112, the latitude $\varphi$ output from the GPS sensor 110, the longitude $\lambda$ output from the GPS sensor 110, an altitude (the GPS altitude) hg output from the GPS sensor 110, and a time t (an example of a current time) output from the clocking unit 160 are applied to the signal processing unit 121. Here, the time t includes information of the number of years, the number of months, the number of days, and a time. Furthermore, it is possible to omit the number of years from the time t. The time t may include information of seconds. In addition, the time t may be suitably corrected according to a GPS time obtained from the GPS signal.

The conversion unit 122 applies the barometric pressure P output from the barometric pressure sensor 112 to a predetermined conversion expression (a height measurement expression), and thus, converts the barometric pressure P into a barometric pressure sensor altitude h, and outputs the barometric pressure sensor altitude h. The conversion and the output, for example, are performed by being repeated at a predetermined time interval. Accordingly, for examples, in a case where the time interval is every second, the barometric pressure sensor altitude h output from the conversion unit 122 indicates the altitude of the spot where the electronic device 1 exists approximately in real time.

Here, the conversion expression used by the conversion unit 122, for example, is represented by Expression (1) described below.

Here, in Conversion Expression (1), a parameter P0 is an ocean surface barometric pressure, and a parameter T0 is an ocean surface ambient temperature. The values of the parameters P0 and T0 are set (calibrated) by the calibration unit 123 at a necessary timing or periodically.

Furthermore, the barometric pressure sensor altitude h output from the conversion unit 122 is written in the storage unit 130 as the altitude in the log data 131 by a record processing unit (not illustrated) of the processing unit 120. In addition, the barometric pressure sensor altitude h output from the conversion unit 122 is converted into image data indicating an altitude value by a display processing unit (not illustrated) of the processing unit 120, and is displayed on the display unit 170 as an image. Alternatively, the barometric pressure sensor altitude h output from the conversion unit 122, for example, is converted into sound data indicating the altitude by a notification processing unit (not illustrated) of the processing unit 120, and is output from the sound output unit 180 as a sound.

The barometric pressure P, the latitude $\varphi$, the longitude $\lambda$, the GPS altitude hg, and the time t are input into the calibration unit 123.

Among them, the calibration unit 123 acquires the position information (the latitude $\varphi$, the longitude $\lambda$, and the altitude information h) of the way point close to the current position from the data of the way point data table 133 stored in the storage unit 130, on the basis of the information of the latitude $\varphi$ and the longitude $\lambda$ in the current position, which are output from the GPS sensor 110. Further, the calibration unit 123 determines the altitude hw in the current position from the position information of the way point, calculates an ocean surface ambient temperature T0 on the basis of the determined altitude hw, and sets the value of the ocean surface ambient temperature T0 in the conversion unit 122. Furthermore, processing of determining the altitude hw in the current position from the position information and the altitude information of the way point will be described below.

In addition, the electronic device 1 is mounted on an arm portion or the like of the user. Accordingly, the ground height may be further corrected with respect to the altitude hw indicating the ground surface, in consideration of the ground height of the electronic device 1 at the time of walking of the user. For example, the ground height is set to approximately 1 m, correction of adding 1 m to the altitude hw is performed, and the processing of this embodiment is performed by using the altitude after being corrected instead of the altitude hw. Accordingly, it is possible to improve the accuracy of the calibration or the barometric pressure altitude calculation.

In addition, the calibration unit 123 applies the barometric pressure P, the altitude hw in the current position which is determined from the way point, and the value of the ocean surface ambient temperature T0 to Conversion Expression (2) described below, and thus, calculates an ocean surface barometric pressure P0, and sets the value of the ocean surface barometric pressure P0 in the conversion unit 122.

$$h = \frac{\left(1 - \left(\frac{P}{P0}\right)^{\frac{1}{5.257}}\right) \times (T0 + 273.15)}{0.0065} \quad (1)$$

$$P0 = P \times \left(\frac{1 - (0.0065 \times hw)}{T0 + 273.15}\right)^{-5.257} \quad (2)$$

Thus, the calibration unit 123 does not require user input or network connection, and thus, the calibration of the conversion unit 122 can be performed even under a situation where the user input or the network connection is not capable of being performed.

1-3. Processing of System 1-3-1. Processing of Information Terminal

Figure 6:
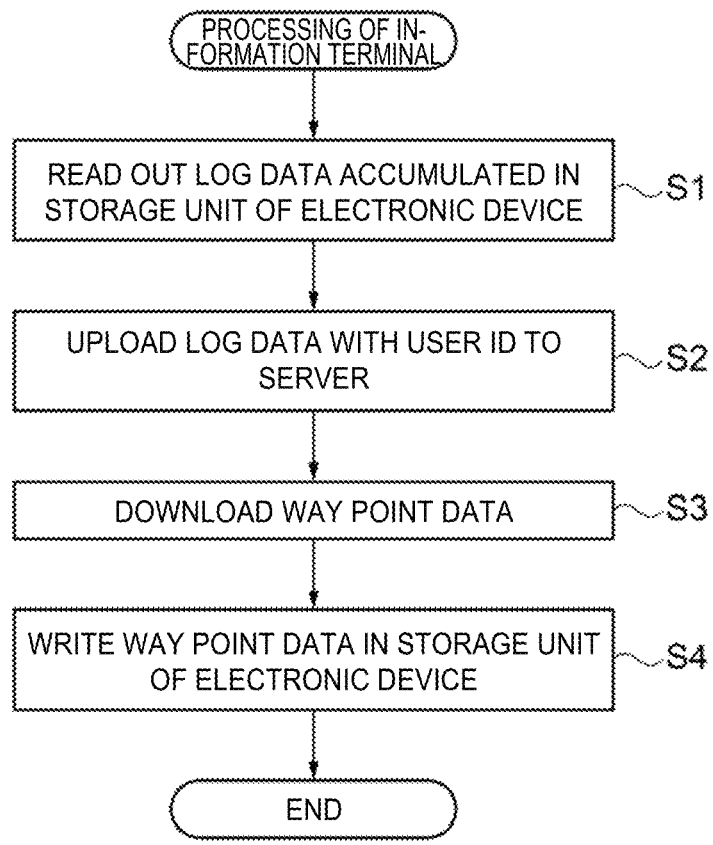
FIG. 6 is a flowchart illustrating processing of an information terminal relevant to previous preparation.

FIG. 6 is a flowchart for illustrating processing of the information terminal 2 relevant to the previous preparation. In the previous preparation, it is assumed that the information terminal 2 is connected to the network 3 and the electronic device 1, and is in a state where the information terminal 2 is capable of communicating with the electronic device 1 and the server 4. Hereinafter, each step of FIG. 6 will be sequentially described.

Step S1: The processing unit 220 of the information terminal 2 communicates with the processing unit 120 of the electronic device 1 through the communication unit 290 of the information terminal 2 and the communication unit 190 of the electronic device 1, and reads out the log data accumulated in the storage unit 130 of the electronic device 1.

Step S2: The processing unit 220 of the information terminal 2 transmits the log data to which the user ID is applied (log data with a user ID) to the processing unit 420 of the server 4 in a predetermined format. The transmission is performed through the communication unit 290 of the information terminal 2, the network 3, and the communication unit 490 of the server 4.

Step S3: The processing unit 220 of the information terminal 2 notifies the mountain climbing route or the like, which is planned, to the processing unit 420 of the server 4. The notification is performed through the communication unit 290 of the information terminal 2, the network 3, and the communication unit 490 of the server 4. In addition, the mountain climbing route to be notified, for example, is a mountain climbing route designated in advance with respect to the information terminal 2 by the user. Then, the processing unit 220 of the information terminal 2 receives data of a way point (a latitude, a longitude, and an altitude) including an important point of the notified mountain climbing route (for example, a water place, a mountain cabin, and a mountain peak) from the processing unit 420 of the server 4. The receiving is performed through the communication unit 490 of the server 4, the network 3, and the communication unit 290 of the information terminal 2.

Step S4: The processing unit 220 of the information terminal 2 writes the received way point data in the storage unit 130 of the electronic device 1 in a predetermined format. The writing is performed through the communication unit 290 of the information terminal 2 and the communication unit 190 of the electronic device 1.

1-3-2. Processing of Electronic Device (Barometric Pressure and Altitude Measurement)

Figure 7:
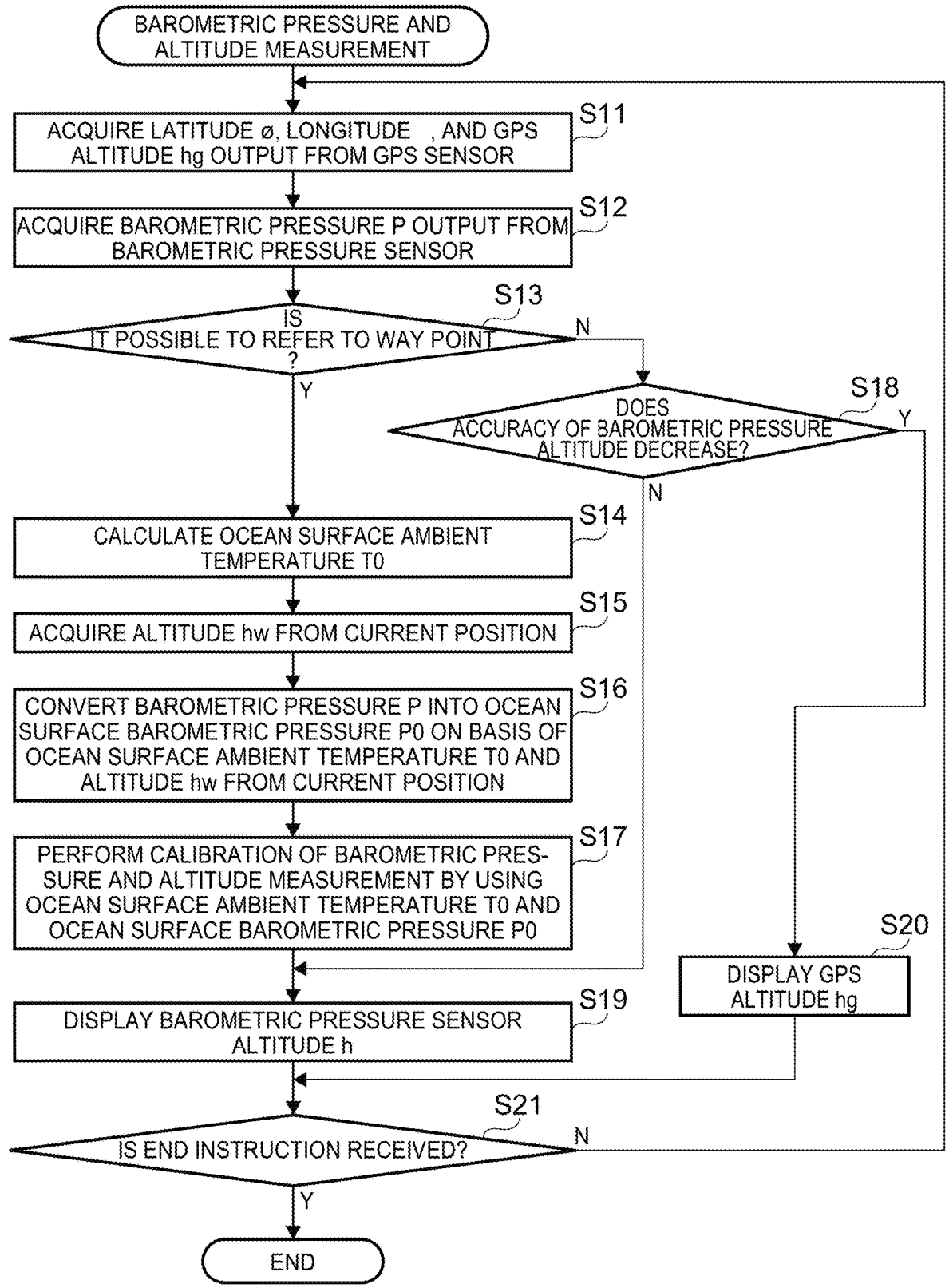
FIG. 7 is flowchart illustrating processing of the electronic device relevant to barometric pressure and altitude measurement.

FIG. 7 is a flowchart for illustrating processing (an altitude calculation method) of the electronic device 1 relevant to the barometric pressure and altitude measurement. This flow, for example, is executed according to a start instruction from the user on the day of mountain climbing, and is executed according to the barometric pressure and altitude measurement program 132. That is, this flow is an example of the altitude measurement method which is executed by reading out the barometric pressure and altitude measurement program 132 by the processing unit 120. Furthermore, the start instruction, for example, is input by operating the operation unit 150 by the user. Hereinafter, each step of FIG. 7 will be sequentially described.

Step S11: The processing unit 120 of the electronic device 1 refers to (acquires) the latitude φ, the longitude λ, and the GPS altitude hg, which are output from the GPS sensor 110. The latitude φ, the longitude λ, and the GPS altitude hg indicates the position of the spot where the electronic device 1 exists.

Step S12: The processing unit 120 refers to (acquires) the barometric pressure P output from the barometric pressure sensor 112. The barometric pressure P indicates the barometric pressure of the spot where the electronic device 1 exists.

Step S13: The processing unit 120 determines whether or not it is possible to refer to the way point. For example, in a case where a way point in a range of a distance set in advance exists in the storage unit 130 at the time of acquiring the latitude φ and the longitude λ output from the GPS sensor 110, the processing unit 120 determines that it is possible to refer to the way point, and in a case where the way point does not exist in the storage unit 130, the processing unit 120 determines that it is not possible to refer to the way point. In a case where the processing unit 120 determines that it is possible to refer to the way point (Y of S13), the process proceeds to a step S14, and in a case where the processing unit 120 determines that it is not possible to refer to the way point (N of S13), the process proceeds to a step S18. In this embodiment, the way point is indicated by coordinates. On the other hand, it is general that in the important point of the mountain climbing route has a certain degree of area. For this reason, even in a case where the user arrives at the important point designated as the way point, it does not mean that the user passes through the coordinates itself of the way point. By setting the range of the distance, it is possible to prevent a situation in which it is not possible to perform the calibration in a case where the user does not pass through the coordinates.

The distance set in advance (hereinafter, referred to as a reference distance) may be suitably set such that necessary accuracy of the altitude is obtained. For example, 5 m is set as the reference distance, and thus, it is possible to control an error of the altitude acquired by the processing unit 120 from the way point in a range suitable for the mountain climbing. In a case where the reference distance is 5 m, for example, in the geography at a gradient of 20%, the error of the altitude of the way point acquired by the processing unit 120 (an altitude difference with respect to the spot where the electronic device 1 exists) is less than or equal to ±1 m. Furthermore, an aspect can also be assumed in which the reference distance can be changed on the basis of a reduction scale of the map to be displayed, a distribution density of the set way point, the operation of the user, and the like.

Step S14: The processing unit 120 calculates (estimates) the ocean surface ambient temperature T0 by using a temperature T of the temperature sensor 111 and the altitude hg output from the GPS sensor 110. Here, a conversion expression used by the calibration unit 123, for example, is represented by Expression (3) described below.

$$T0 = T + hg/100 \times 0.6 \qquad (3)$$

Step S15: The processing unit 120 acquires the way point data which can be applied to the spot where the electronic device 1 exists, on the basis of the latitude φ and the longitude λ. In a case where there is one way point which becomes a target, the processing unit 120 sets the altitude of the way point to the altitude hw in the current position, and in a case where there are a plurality of way points which become targets, the processing unit 120 determines the altitude hw in the current position from the plurality of way points, on the basis of a method described below.

Furthermore, in this flowchart, the ocean surface ambient temperature T0 is calculated by using the altitude hg output from the GPS sensor 110, and the ocean surface ambient temperature T0 may be more accurately calculated by using the altitude hw acquired in the step S15.

Step S16: The processing unit 120 converts the barometric pressure P into the ocean surface barometric pressure P0, on the basis of the ocean surface ambient temperature T0 and the altitude hw in the current position. A conversion expression to the ocean surface barometric pressure P0 from the barometric pressure P is Expression (2) described above.

Step S17: The processing unit 120 performs the calibration of the conversion unit 122 on the basis of the calculated ocean surface ambient temperature T0 and the value of the ocean surface barometric pressure P0. In this embodiment, the processing unit 120 sets the calculated ocean surface ambient temperature T0 and the value of the ocean surface barometric pressure P0 to the parameters T0 and P0 of Conversion Expression (1) which are used in the conversion unit 122.

Step S18: The processing unit 120 determines whether or not the accuracy of the barometric pressure altitude decreases. Specifically, the processing unit 120 refers to the time t output from the clocking unit 160. The time t indicates information of the number of months at the current time, the number of days at the current time, and a current time. Then, the processing unit 120 calculates a difference between the current time and a time at which the previous calibration is performed, and in a case where an elapsed time is longer than or equal to time set in advance, the processing unit 120 determines that the accuracy of the barometric pressure altitude decreases (Y of S18), and the process proceeds to a step S20. On the other hand, in a case where the elapsed time is shorter than the time set in advance, the processing unit 120 determines that the accuracy of the barometric pressure altitude does not decrease (N of S18), and the process proceeds to a step S19. The time set in advance, for example, can be set to 1 hour, 1 hour and 30 minutes, and the like.

Furthermore, though it is not illustrated, even in a case where the elapsed time is shorter than the time set in advance, the processing unit 120 calculates a difference between the altitude hg output from the GPS sensor 110 and the altitude h calculated by the barometric pressure P output from the barometric pressure sensor 112, and in a case where the difference is greater than a value set in advance, the processing unit 120 determines that the accuracy of the barometric pressure altitude decreases, and the process may proceed to the step S20.

Step S19: The processing unit 120 calculates the barometric pressure sensor altitude h, and displays the barometric pressure sensor altitude h on the display unit 170 as an image such as a text, and the process proceeds to a step S21. In addition, as necessary, the processing unit 120 may output the barometric pressure sensor altitude h to the sound output unit 180 as a sound.

Step S20: The processing unit 120 refers to a GPS sensor altitude hg, and displays a GPS barometric pressure sensor altitude hg on the display unit 170 as an image such as a text, and the process proceeds to the step S21. In addition, as necessary, the processing unit 120 may output the GPS sensor altitude hg to the sound output unit 180 as a sound.

Step S21: The processing unit 120 determines whether or not an end instruction is received, and in a case where the processing unit 120 determines that the end instruction is received (Y of S21), a set of processings end. In addition, in a case where the processing unit 120 determines that the end instruction is not received (N of S21), the process returns to the step S11.

In the flow described above, the sequence of the steps can be suitably changed. For example, the sequence can also be reversed between the step S11 and the step S12.

1-3-3. Processing of Electronic Device (Calibration Processing)

Figure 8:
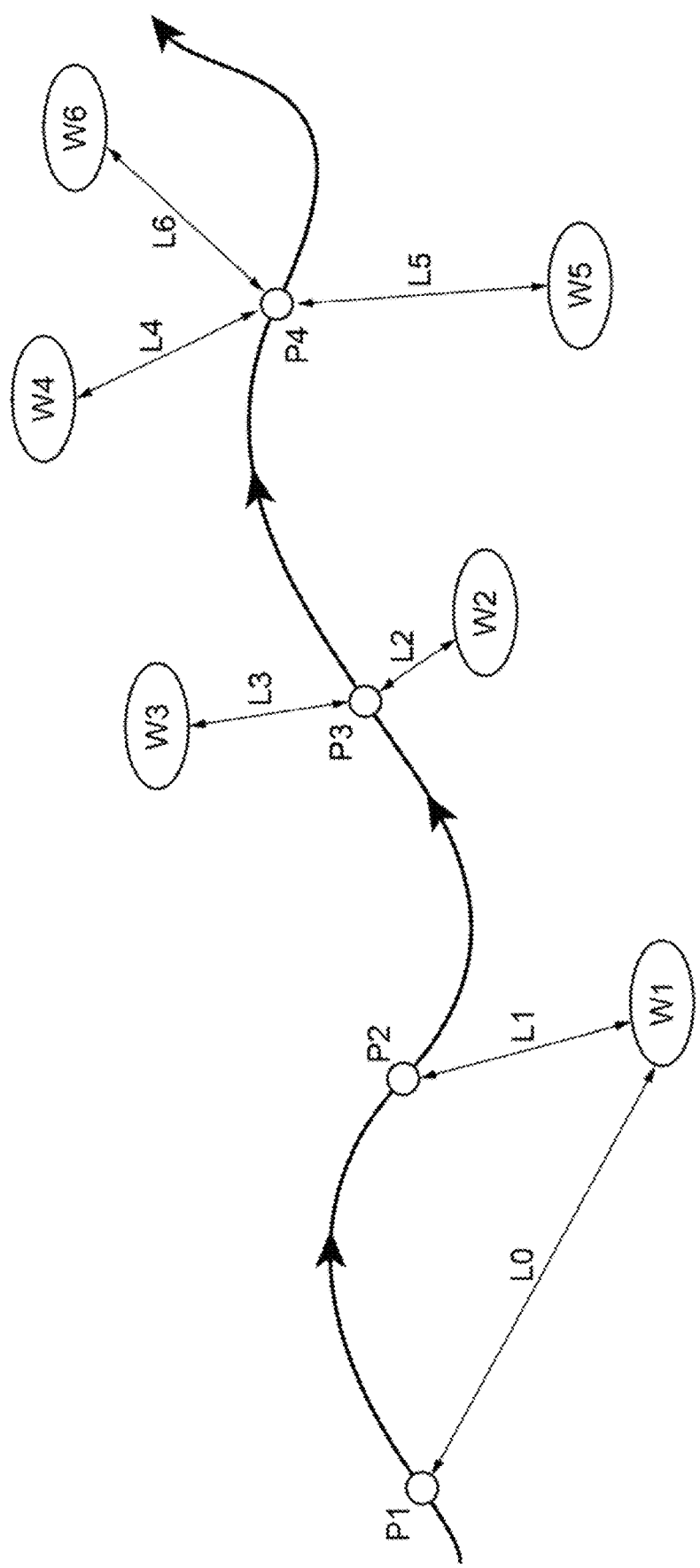
FIG. 8 is a diagram illustrating an example of calibration processing of the electronic device.

FIG. 8 illustrates an example in which calibration processing of the electronic device 1 is performed during mountain climbing.

In this case, way points of six places (W1 to W6) are set in advance, according to the mountain climbing route. The user wears the electronic device 1, starts mountain climbing, and plans to sequentially pass through spots (P2, P3, and P4) from the spot P1.

In a case where a timing comes at which the calibration unit 123 of the electronic device 1 performs the calibration processing of the barometric pressure and altitude measurement when the user passes through the spot P1, the calibration unit 123 acquires position information of a way point W1 close to the spot P1 from the data of the way point data table 133. The calibration unit 123 recognizes that a distance L0 to the way point W1 is greater than the reference distance from the position information of the GPS sensor 110 and the acquired position information of the way point W1, and determines that there is no referable way point. As a result thereof, the calibration unit 123 stops the calibration processing in the spot P1, and displays the current position including the GPS sensor altitude hg or the barometric pressure sensor altitude h.

Next, in a case where a timing comes at which the calibration unit 123 of the electronic device 1 performs the calibration processing of the barometric pressure and altitude measurement when the user passes through the spot P2, the calibration unit 123 acquires the position information of the way point W1 close to the spot P2 from the data of the way point data table 133. The calibration unit 123 recognizes that a distance L1 to the way point W1 is less than or equal to the reference distance from the position information of the GPS sensor 110 and the acquired position information of the way point W1, and determines that it is possible to refer to the way point. As a result thereof, the calibration unit 123 executes the calibration processing by referring to the way point W1, performs the calibration, and then, calculates the barometric pressure sensor altitude h, and displays the current position. Hereinafter, the barometric pressure sensor altitude h in motion is calculated at a predetermined timing, the barometric pressure sensor altitude h is displayed along with latitude and longitude information from the GPS sensor 110.

Next, in a case where a timing comes at which the calibration unit 123 of the electronic device 1 performs the calibration processing of the barometric pressure and altitude measurement when the user passes through the spot P3, the calibration unit 123 acquires position information of way points W2 and W3 close to the spot P3 from the data of the way point data table 133. The calibration unit 123 recognizes that all of a distance L2 from the spot P3 to the way point W2 and a distance L3 from the spot P3 to the way point W3 are less than or equal to the reference distance from the position information of the GPS sensor 110 and the acquired position information of the way points W2 and W3, and determines that a way point is referred to as the way point W2 since the distance L2 is minimized in the distance L2 and the distance L3. As a result thereof, the calibration unit 123 executes the calibration processing by referring to the way point W2. After the calibration is performed, the barometric pressure sensor altitude h is calculated, and the current position and the altitude are displayed. In this case, there is a high possibility that in the way points W2 and W3, W2 having a short distance has a small altitude difference with respect to P3. Therefore, it is possible to suppress a decrease in calibration accuracy by referring to a way point having a minimum distance.

Next, in a case where a timing comes at which the calibration unit 123 of the electronic device 1 performs the calibration processing of the barometric pressure and altitude measurement when the user passes through the spot P4, the calibration unit 123 acquires position information of way points W4, W5, and W6 close to the spot P4 from the data of the way point data table 133. The calibration unit 123 recognizes that all of a distance L4 from the spot P4 to the way point W4, a distance L5 from the spot P4 to the way point W5, and a distance L6 from the spot P4 to the way point W6 are not greater than the reference distance from the position information of the GPS sensor 110 and the acquired position information of the way points W4, W5, and W6. The calibration unit 123 applies the altitude hw in the spot P4 to Expression (4) described below, on the basis of the distances L4, L5, and L6 from each of the way points and altitudes h4, h5, and h6 of each of the way points, and calculates a weighted average.

$$hw=(h4/L4+h5/L5+h6/L6)/(1/L4+1/L5+1/L6) \quad (4)$$

The calibration is performed by using the average value of the altitudes of the way points calculated as described above, and thus, for example, even in a case where the geography is not even, and in an altitude of one way point, an error with respect to the altitude of the spot P4 is slightly large, the value is leveled, and a decrease in the calibration accuracy can be suppressed. Furthermore, only one of a method of referring to the way point having the minimum distance and a method of adopting the average value may be used, and the methods may be separately used as necessary. For example, in a case where the distances are considerably different from each other such as the distance L2 of 1 m and the distance L3 of 4.8 m, as an example of the spot P3, the way point having the minimum distance may be adopted, and in a case where a difference between the distance L2 and the distance L3, for example, is less than 1 m, the average may be adopted. In addition, in a case where only one way point of three or more way points has a long distance, the average altitude hw may be determined by using the other way points except for the way point having a long distance.

Figure 9:
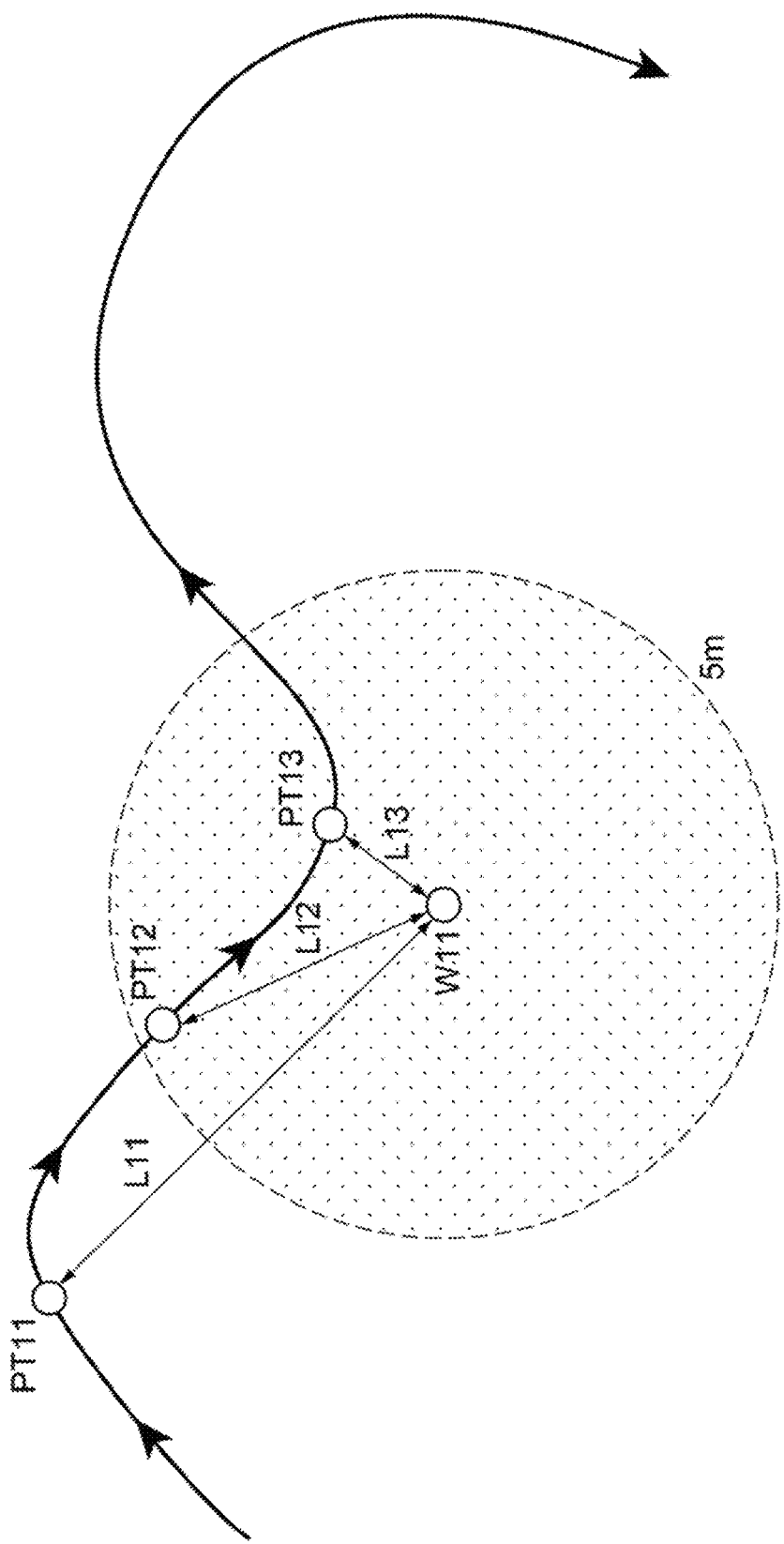
FIG. 9 is a diagram illustrating an application timing example of the calibration processing of the electronic device.

FIG. 9 is a diagram illustrating an application timing example of the calibration processing of the electronic device 1.

In this example, a way point W11 of one place is set according to the mountain climbing route. The user wears the electronic device 1 and starts mountain climbing, and sequentially passes through a spot PT11, spot PT12, and a spot PT13.

In a case where the calibration unit 123 of the electronic device 1 performs the calibration processing of the barometric pressure and altitude measurement when the user passes through the spot PT11, the calibration unit 123 acquires position information of the way point W11 close to the spot PT11. The calibration unit 123 recognizes that a distance L11 to the way point W11 is greater than 5 m which is the reference distance from the position information of the GPS sensor 110 and the acquired position information of the way point W11, and the calibration processing in the spot PT11 is not performed.

Next, in a case where the calibration unit 123 of the electronic device 1 performs the calibration processing of the barometric pressure and altitude measurement when the user passes through the spot PT12, the calibration unit 123 acquires the position information of the way point W11 close to the spot PT12. The calibration unit 123 recognizes that a distance L12 to the way point W11 is not greater than 5 m from the position information of the GPS sensor 110 and the acquired position information of the way point W11, and determines that it is possible to refer to the way point W11. As a result thereof, the calibration unit 123 executes the calibration processing by referring to the way point W11.

Next, in a case where the calibration unit 123 of the electronic device 1 performs the calibration processing of the barometric pressure and altitude measurement when the user passes through the spot PT13, the calibration unit 123 acquires the position information of the way point W11 lose to the spot PT13. The calibration unit 123 recognizes that a distance L13 to the way point W11 is not greater than 5 m, and determines it is possible to refer to the way point W11.

Here, the calibration unit 123 determines whether or not a distance between the electronic device 1 and the way point W11 is greater than 5 m during a period from performing the calibration processing in PT12 to moving to PT13. In a case where it is determined that the distance is greater than 5 m, the calibration unit 123 determines the calibration in PT12 is invalid. On the other hand, in a case where it is determined that the distance is not greater than 5 m, the calibration unit 123 determines that the accuracy of the barometric pressure altitude is sufficient by the calibration in PT12, and the calibration in PT13 is not performed. Accordingly, the processing amount of the electronic device 1 is reduced, and battery lifetime of the electronic device 1 can be extended.

According to the embodiments described above, the following effects are obtained.

Before mountain climbing is executed, the user stores the position and the altitude of the way point indicating a candidate of a spot to be used in the storage unit 130 of the electronic device 1, determines the altitude of the current location from the altitude of the way point at a predetermined timing during mountain climbing, on the basis of a relationship between the position obtained from the GPS signal and the position of the adjacent way point, performs the calibration on the basis of the determined altitude, and calculates the altitude in motion on the basis of the barometric pressure detected by the barometric pressure sensor 112. For this reason, it is possible to decrease a storage capacity of the storage unit 130, and thus, the size and the cost of the electronic device 1 are reduced.

In addition, in a case where the calibration processing is performed on the basis of information of one way point, and then, the calibration processing is performed at the next timing, and in a case where a location is in a predetermined reference distance from the way point, the calibration is not performed, and thus, the battery lifetime of the electronic device 1 can be extended.

In addition, the altitude obtained from the way point is adopted in the calibration instead of the altitude obtained from the GPS signal, and thus, the current altitude can be obtained with high accuracy.

In addition, the position and the altitude of the way point are stored in the storage unit 130 of the electronic device 1, and thus, it is not necessary to input the way point by the operation of the user during mountain climbing or to receive the information of the way point by radio communication or the like. The user may not care about the operation for obtaining the way point, and thus, can concentrate on mountain climbing. In addition, communication during mountain climbing is not essential, and thus, the power consumption of the electronic device 1 is reduced.

2. Modification Example

As described above, the embodiments of the invention made by the present inventors have been described in detail, but the invention is not limited to the embodiments described above, and various changes can be added in a range not deviating from the gist thereof. Furthermore, in the following description, the same reference numerals will be applied to the same portions as those described above, and the description thereof will be omitted.

2-1. Example of Case where Altitude is not Included in Way Point

For example, in the embodiments described above, it is described that the calibration is performed by using the altitude hw included in the way point, but calibration using the altitude hg of the GPS may be performed.

Figure 10:
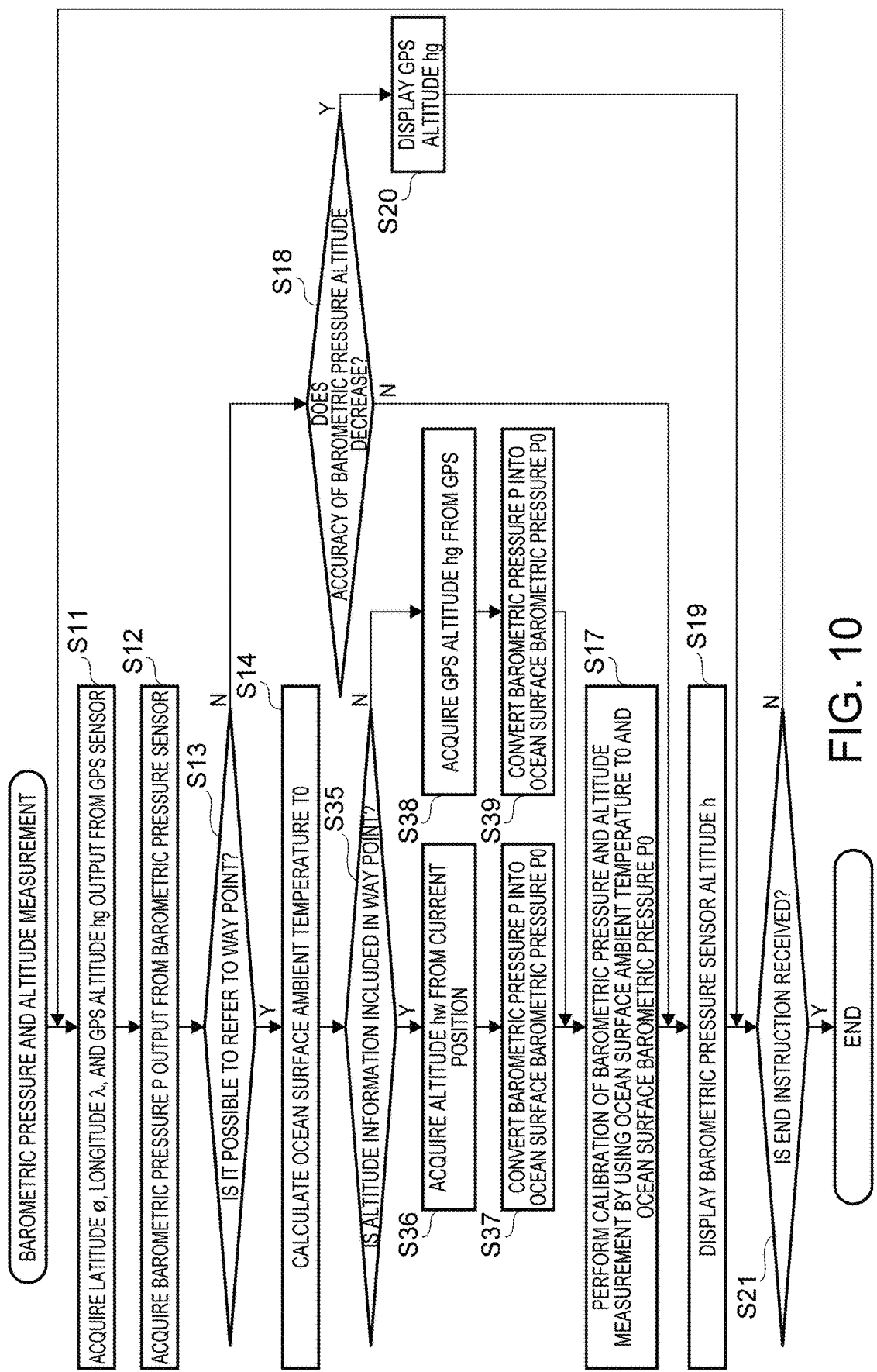
FIG. 10 is a flowchart illustrating a modification example of calibration.

FIG. 10 is a flowchart for illustrating an example of the calibration using the altitude of the GPS in the modification example described above.

Step S35: The processing unit 120 acquires the way point data which can be applied to the spot where the electronic device 1 exists, on the basis of the latitude φ and the longitude λ, and determines whether or not information of an altitude is included in the acquired way point data. Here, in a case where the altitude exists in a way point which becomes a target (Y of S35), the processing unit 120 determines that the altitude included in the way point is used, as with the flowchart of FIG. 7, and the process proceeds to a step S36. In addition, in a case where the altitude does not exist in the way point which becomes a target (N of S35), the processing unit 120 determines that the calibration using the altitude hg of the GPS is used, and the process proceeds to a step S38.

Step S36: The processing unit 120 acquires the way point data which can be applied to the spot where the electronic device 1 exists, on the basis of the latitude φ and the longitude λ. In a case where there is one way point which becomes a target, the processing unit 120 sets the altitude of the way point to the altitude hw in the current position, and in a case where there are a plurality of way points which become targets, the processing unit 120 determines the altitude hw in the current position from the altitudes of the plurality of way points, on the basis of the method illustrated in FIG. 8.

Step S37: The processing unit 120 converts the barometric pressure P into the ocean surface barometric pressure P0, on the basis of the ocean surface ambient temperature T0 and the altitude hw in the current position. A conversion expression to the ocean surface barometric pressure P0 from the barometric pressure P is Expression (2) described above. After this processing is performed, the process proceeds to the step S17.

Step S38: The processing unit 120 acquires the GPS altitude hg output from the GPS sensor 110 which is referred to in the step S11.

Step S39: The processing unit 120 converts the barometric pressure P into the ocean surface barometric pressure P0, on the basis of the ocean surface ambient temperature T0 and the GPS altitude hg. A conversion expression to the ocean surface barometric pressure P0 from the barometric pressure P is Expression (2) described above. After the processing is performed, the process proceeds to the step S17.

According to this modification example, even in a case where the information of the altitude is not included in the way point which is used by the calibration unit 123, the processing unit 120 is capable of performing calibration using a GPS positioning result. Accordingly, even in a case where the way point data table 133 is not sufficient, processing unit 120 performs suitable calibration, and thus, the electronic device 1 is capable of providing an altitude having high accuracy to the user, compared to a case where the calibration is not performed when the altitude h is not included in the way point.

2-2. Determination of Performing Calibration

In the flowchart of FIG. 7, in a case where a referable way point exists, the processing unit 120 necessarily performs the calibration, but in a case where the processing unit 120 determines that the GPS sensor 110 does not acquire correct position information from the result of monitoring the state of the GPS sensor 110, the calibration of the barometric pressure and altitude measurement may not be performed.

Figure 11:
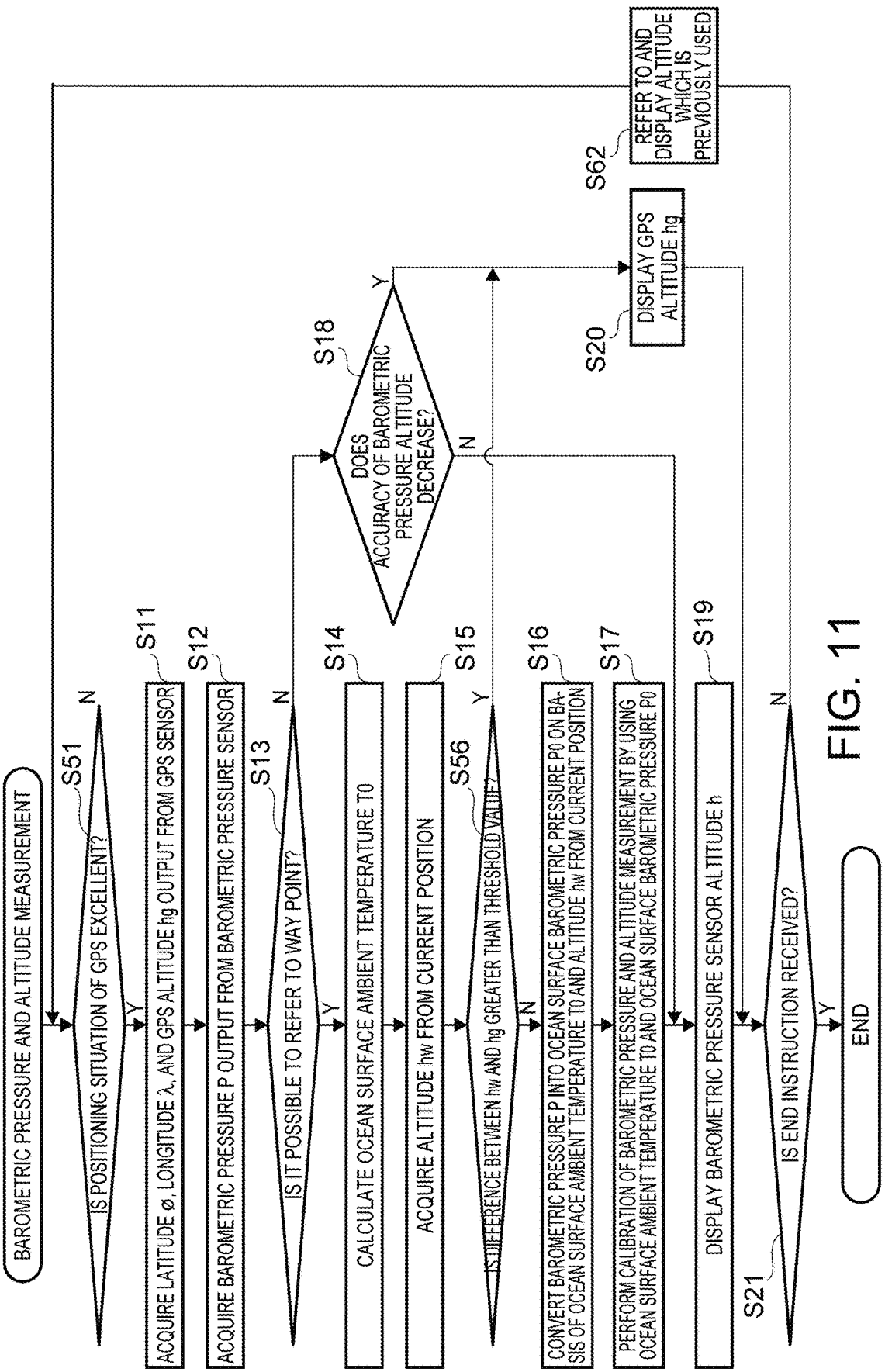
FIG. 11 is a flowchart illustrating a modification example of the calibration.

FIG. 11 is a flowchart for illustrating an example of determining whether or not the calibration is performed in the modification example described above.

Step S51: The processing unit 120 acquires a positioning situation from the GPS sensor 110, and acquires information correlating with the accuracy of the acquired latitude φ and the acquired longitude λ. The processing unit 120 determines whether or not the accuracy of the acquired latitude φ and the required longitude λ are less than or equal to a threshold value set in advance, that is, whether or not the positioning situation is excellent, from the information correlating with the accuracy which is acquired from the GPS sensor 110. As a result of determination, in a case where it is determined that the positioning situation is excellent (Y of S51), the processing unit 120 determines that it is possible to use the acquired latitude φ and the acquired longitude λ for performing the calibration or for displaying the altitude, and the process proceeds to the step S11. On the other hand, as a result of determination, in a case where it is determined that the positioning situation is not excellent (N of S51), the calibration unit 123 determines that it is not possible to use the acquired latitude φ and the acquired longitude λ for performing the calibration or for displaying the altitude, and the process proceeds to a step S62.

Step S56: The processing unit 120 compares the altitude hg of the GPS with the altitude hw in the current position. In a case where the comparison result is less than or equal to a threshold value set in advance (N of S56), the processing unit 120 determines that the calibration is performed, and the process proceeds to a step S16. On the other hand, in a case where the comparison result is greater than the threshold value set in advance (Y of S56), the processing unit 120 determines the calibration is not performed, and the process proceeds to the step S20.

Step S62: The processing unit 120 refers to the altitude which is previously used, and displays the altitude on the display unit 170 as an image such as a text. This is because the positioning situation of the GPS sensor 110 is not excellent, and thus, in a case where the current positioning result is used, it is not possible to calculate an accurate altitude. In addition, as necessary, the processing unit 120 outputs the altitude which is previously used to the sound output unit 180 as a sound.

According to this modification example, in a case where the accuracy of the latitude φ and the longitude λ acquired by the processing unit 120 from the GPS sensor 110 is not excellent, it is possible to prevent the calibration unit 123 from performing the calibration by using way point data indicating a position separated from the position where the electronic device 1 actually exists. Accordingly, even in a case where a large error is incorporated in the latitude φ and the longitude λ output from the GPS sensor 110, the processing unit 120 is capable of preventing unsuitable calibration from being performed, and thus, the electronic device 1 is capable of providing an altitude having high accuracy to the user.

3. Other Modification Examples

For example, in the embodiments described above, the information terminal 2 or the electronic device 1 may be equipped with a part of the functions of the server 4, and the server 4 may be equipped with a part of the functions of the information terminal 2 or the electronic device 1. In addition, in the embodiments described above, the information terminal 2 may be equipped with a part or all of the functions of the electronic device 1, and the electronic device 1 may be equipped with a part or all of the functions of the information terminal 2.

In addition, in the embodiments described above, an example is described where the user designates the spot on the map, and thus, the way point is prepared, but the user may select a desired route, and thus, the way point can be acquired. For example, the user displays the mountain climbing route registered in the server 4 on the map or displays the mountain climbing route as a list by using the application software of the information terminal 2, and selects a desired route therefrom. The selected route includes data of one or more way points, and the data of the way point is written in the storage unit 130 of the electronic device 1 in the format of the way point data table, as with the embodiments described above. According to this, even in a case where the user does not care about the preparation of the way point, the altitude calculation using the altitude of the way point can be performed. Furthermore, any one method of the preparation and acquisition methods of the way point described in the embodiments described above and this modification example can be executed, or two or more methods can be combined.

In addition, the electronic device 1 or the information terminal 2 may be equipped with a known function of a smart phone, for example, a camera function, a calling function, a notification function such as a mail, a sensing function relevant to a movement (for example, an inertial sensor such as an acceleration sensor and an angular velocity sensor, and the like), and a sensing function relevant to organic activity (for example, a humidity sensor, a pulse sensor, and the like). Needless to say, various performance information items (a speed, a pulse beat, calorie consumption, and the like), as necessary, are calculated, notified, recorded, and the like, according to the type of sensor to be mounted.

In addition, the electronic device 1 or the information terminal 2 can be configured of various types of portable information devices such as a wrist type electronic device, an earphone type electronic device, a ring type electronic device, a pendant type electronic device, an electronic device used by being mounted on sport equipment, a smart phone, a head mount display (HMD), and a head up display (HUD), and a combination thereof.

In addition, examples of the application of the electronic device 1 or the information terminal 2 include skiing (also including cross-country skiing or ski jumping), running, a bicycle, walking, triathlon, dieting, rehabilitation, skating, golf, a bike, trail running, a paraglider, a dog sleigh, a flying robot (a radio control robot), navigation, and the like, in addition to mountain climbing.

In addition, the electronic device 1 or the information terminal 2 of the embodiments described above may perform the notification of the information with respect to the user by any one of image display, sound output, and vibration, and may perform the notification of the information with respect to the user by combining at least two of the image display, the sound output, and the vibration.

In addition, in the embodiments described above, the global positioning system (GPS) is used as an integrated global satellite positioning system, but other global navigation satellite systems (GNSS) may be used. For example, one or two or more of satellite positioning systems such as an European geostationary-satellite navigation overlay service (EGNOS), a quasi zenith satellite system (QZSS), a global navigation satellite system (GLONASS), GALILEO, and a BeiDou navigation satellite system (BeiDou) may be used. In addition, a satellite-based augmentation system (SBAS) such as a wide area augmentation system (WAAS), and an European geostationary-satellite navigation overlay service (EGNOS) may be used in at least one of the satellite positioning systems.

In addition, each of the embodiments described above and each of the modification examples are examples, and the invention is not limited thereto. For example, each of the embodiments described above and each of the modification examples can also be suitably combined.

In addition, the invention includes a configuration which is substantially the same as the configuration described in the embodiments (for example, a configuration having the same function, the same method, and the same result or a configuration having the same object and the same effect). In addition, the invention includes a configuration in which an unessential portion of the configuration described in the embodiments is replaced. In addition, the invention includes a configuration obtaining the same functional effect as that of the configuration described in the embodiments or a configuration attaining the same object as that of the configuration described in the embodiments. In addition, the invention includes a configuration in which a known technology is added to the configuration described in the embodiments.

What is claimed is:
1. An electronic device, comprising:
a memory configured for storing a predetermined range and a way point, wherein the way point comprises a first latitude, a first longitude, and a first altitude;
a barometric pressure sensor configured for detecting a barometric pressure;
a GPS receiving unit configured for receiving a positioning signal from a positioning satellite, and with the positioning signal determining a position comprising a second latitude, a second longitude and a second altitude;
a processor configured for:
determining a distance between the position calculated from the positioning signal and the way point;
determining that the distance is within the predetermined range, and in response to determining that the distance is within the predetermined range:
calculating an ocean surface ambient temperature using the second altitude;
calculating an ocean surface barometric pressure using the first altitude, the ocean surface ambient temperature, and the barometric pressure; and calculating a third altitude using the barometric pressure, the ocean surface ambient temperature and the ocean surface barometric pressure; and a display configured for displaying the third altitude corresponding to a current altitude of the electronic device.

2. The electronic device according to claim 1, wherein the memory is further configured for storing a second way point, wherein the processor is further configured to determine that the second way point is within the predetermined range from the position calculated on the basis of the positioning signal, and wherein calculating the ocean surface barometric pressure uses an average altitude of the first altitude and an altitude of the second way point.

3. The electronic device according to claim 1, wherein the processor is further configured to calculate the third altitude based on a ground height of the electronic device.

4. The electronic device according to claim 1, further comprising:

a temperature sensor, wherein the processor is further configured to calculate the third altitude based on a calibration of the barometric pressure sensor based on a temperature detected with the temperature sensor.

5. An altitude calculation method, comprising:

storing, in a memory of a device, a predetermined range and a way point, wherein the way point comprises a first latitude, a first longitude, and a first altitude;

detecting a barometric pressure with a barometric pressure sensor of the device;

receiving a positioning signal from a positioning satellite with a GPS receiver of the device, and with the positioning signal calculating a position comprising a second latitude, a second longitude and a second altitude;

determining a distance between the position calculated from the positioning signal and the way point;

determining that the distance is within the predetermined range, and in response to determining that the distance is within the predetermined range:

calculating an ocean surface ambient temperature using the second altitude;

calculating an ocean surface barometric pressure using the first altitude, the ocean surface ambient temperature, and the barometric pressure; and calculating a third altitude using the barometric pressure, the ocean surface ambient temperature and the ocean surface barometric pressure; and displaying on a display of the device the third altitude which corresponds to a current altitude of the device.

6. The altitude calculation method according to claim 5, further comprising:

storing, in the memory of the device, a second way point; and determining that the second way point is within the predetermined range from the position calculated on the basis of the positioning signal, wherein calculating the ocean surface barometric pressure uses an average altitude of the first altitude and an altitude of the second way point.

7. The altitude calculation method according to claim 5, wherein calculating the third altitude comprises calibration of the barometric pressure sensor based on a temperature detected with a temperature sensor of the device.

* * * * *